INVENTOR.
MATTHEUS J. SCHMITZ
BY
Frank R. Trifari
AGENT

INVENTOR.
MATTHEUS J. SCHMITZ
BY
Frank R. Trifari
AGENT

INVENTOR.
MATTHEUS J. SCHMITZ
BY
Frank R. Jurifani
AGENT

United States Patent Office 3,343,129
Patented Sept. 19, 1967

3,343,129
MARKING CIRCUIT ARRANGEMENT HAVING MEANS FOR SUPPRESSING MARKING POTENTIAL

Mattheus Jacobus Schmitz, Hilversum, Netherlands, assignor to North American Philips Company, Inc., New York, N.Y., a corporation of Delaware Filed Jan. 24, 1964, Ser. No. 339,915
Claims priority, application Netherlands, Jan. 28, 1963, 288,233
5 Claims. (Cl. 340—166)

ABSTRACT OF THE DISCLOSURE

The specification described a switching network including a plurality of switching matrices having electronic bistable crossings (e.g. pnpn transistors). The network is connected so that a plurality of channels extend between each of a plurality of inputs and each of a plurality of outputs, with each channel including a crossing of each stage. Each matrix has a plurality of marking wires each connected to a plurality of marking terminals of the electronic switches. In order to avoid interference resulting from the application of marking potential to a marking wire of which one or more electronic switches are in a conductive state, means are provided for detecting the change of state of a marked switch and immediately thereafter suppressing the marking potential applied to the respective marking wire.

The invention relates to a switching network composed of switching matrices having electronic bistable crossings, said arrangement comprising a circuit for marking a channel. Each channel in the network can be identified by the address of a set of coordinates, the first $p (p \geq 1)$ of which identify the relevant input of the switching network, the $(p+1)^{th}$ of which fixes the switching stage, the $(p+2)^{th}$ of which fixes the switching path in the second switching stage, and so on. The switching network comprises a number of marking wires, each of which corresponds to a given value of one of the abovementioned co-ordinates with the exception of the first $p$ co-ordinates an is connected to all crossings of the relevant switching stage through which channels extend, for which the relevant co-ordinate has the relevant value. The application of a marking voltage to a marking wire results in that those of the crossings connected to said marking wire become conducting, through which a channel extends which comprises a conducting crossing in the preceding switching stage. Such a switching network is known inter alia from German patent specification 1,034,221. However, since in the switching network different paths are constantly built up and each marking wire is connected to a large number of crossings, it will frequently occur that a marking wire, which is connected to a plurality of already marked crossings, receives a marking voltage in order to mark also a crossing connected thereto and previously not yet marked. The marking pulse of said marking wire gives rise, however, to an intereference pulse, which is weak, it is true, but yet observable in the channels extending through the marked crossings. These interference pulses produce a noise signal in the relevant channels, which signal may assume a value which, particularly when the switching network is employed for telephone operations, is inadmissible with respect to the speech signal.

It is an object of this invention to mitigate this disadvantage. This is achieved by connecting the crossings connected to the same marking wire to means capable of immediately removing the marking voltage of the marking wire when one of the crossings connected to said marking wire becomes conducting.

One embodiment of the invention will be described more fully with reference to the drawing.

Figure 1:
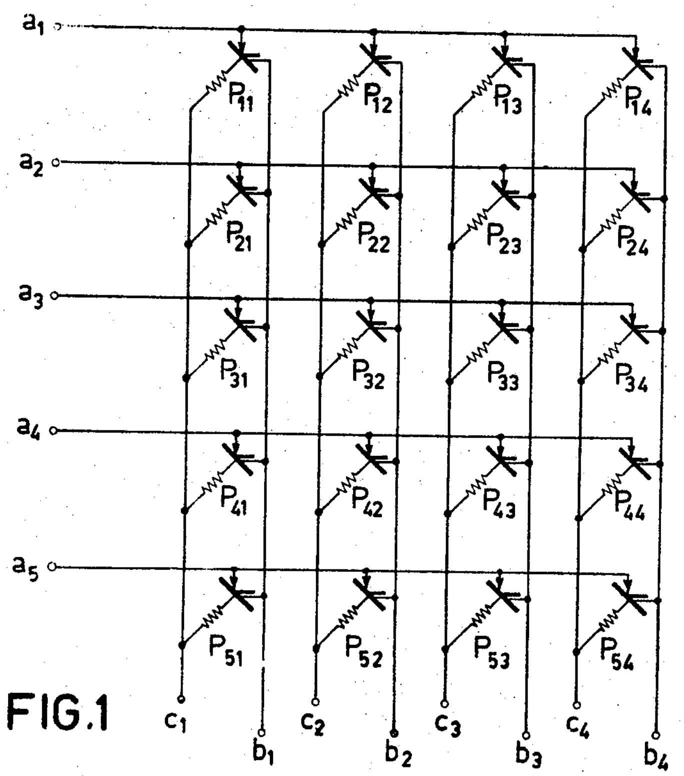
FIG. 1 shows the principal diagram of a switching matrix suitable for composing a switching network according to the invention.
Figure 2:
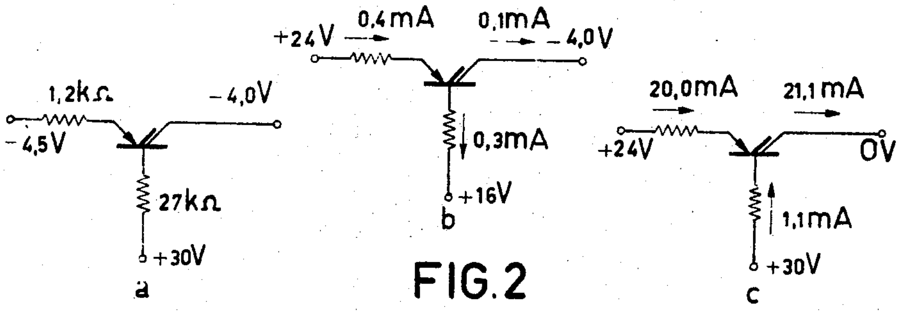
FIG. 2 shows the voltages at the electrodes of the pnpn-transistors in the rest position, used as crossings in the switching matrix shown in FIG. 1 (FIG. 2*a*) during the marking operation (FIG. 2*b*) and in the busy or conducting state (FIG. 2*c*).

FIG. 1 illustrates a switching matrix suitable for use in a switching network having the required properties. In this figure references $a_1$, $a_2$, $a_3$, $a_4$, $a_5$ designate a set of five input wires, $b_1$, $b_2$, $b_3$, $b_4$ designate a set of four output wires and $c_1$, $c_2$, $c_3$, $c_4$ a set of four marking wires. The input wire $a_i$ is connected through a gate $p_{ij}$ to the output wire $b_j$ ($i = 1, 2, 3, 4, 5$; $j = 1, 2, 3, 4$). The marking wire $c_k$ ($k = 1, 2, 3, 4$) is connected to the control-terminals of the gates $p_{1k}$, $p_{2k}$, $p_{3k}$, $p_{4k}$ and $p_{5k}$. Each gate consists mainly of a transistor having a current amplification factor exceeding 1, for instance a pnpn-transistor, the emitter of which constitutes the input and is connected to the relevant $a$-wire, the collector of which constitutes the output and is connected to the relevant $b$-wire and the base of which is connected through a resistor to the relevant $c$-wire. The end of said resistor remote from the base constitutes the control-terminal of the gate. In the rest position of the switching matrix all input wires $a_i$ have a voltage of for instance −4.5 v., all output wires $b_j$ a preferably slightly higher voltage of, for instance −4.0 v. and all marking wires $c_k$ a voltage which is positive relative to the input wires, for example a voltage of +30 v. Each transistor is then in the state illustrated in FIG. 2*a*, so that it is blocked. If the input wire $a_i$ has to be connected to the output wire $b_j$, the voltage of the input wire $a_i$ is raised to +24 v. and the voltage of the marking wire $c_j$ is reduced to +16 v. Thus the transistor arrives in the state illustrated in FIG. 2*b*, so that it becomes conducting. A particularity of this arrangement is, however, that the transistor remains conducting even after the disappearance of the marking voltage of +16 v. or in other words, the transistor has a bistable nature. This is due to the fact that the base current in the pnpn-transistor is not directed away from the base but is directed towards the base, in contradistinction to the pnp-transistor. As a result such a high voltage drop occurs across the resistor in the base circuit that even after the disappearance of the marking voltage the base assumes a negative voltage relative to the emitter, so that the transistor remains conducting. This is even the case when the voltage of the collector is raised to about 20 v., which, in fact, occurs during the marking process, as will be seen hereinafter, and when the voltage of the emitter and the collector drops to about zero volt, which is true, when a channel extending through the relevant transistor is completely marked, which will also be seen hereinafter. Then the transistor arrives finally in the state illustrated in FIG 2*c*.

Figure 3:
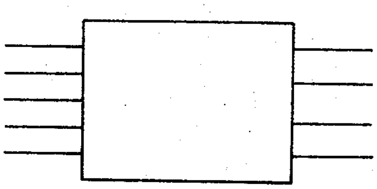
FIG. 3 shows the symbol used in diagrams for a switching matrix.

FIG. 3 shows the symbol used in switching diagrams for a switching matrix.

Figure 4:
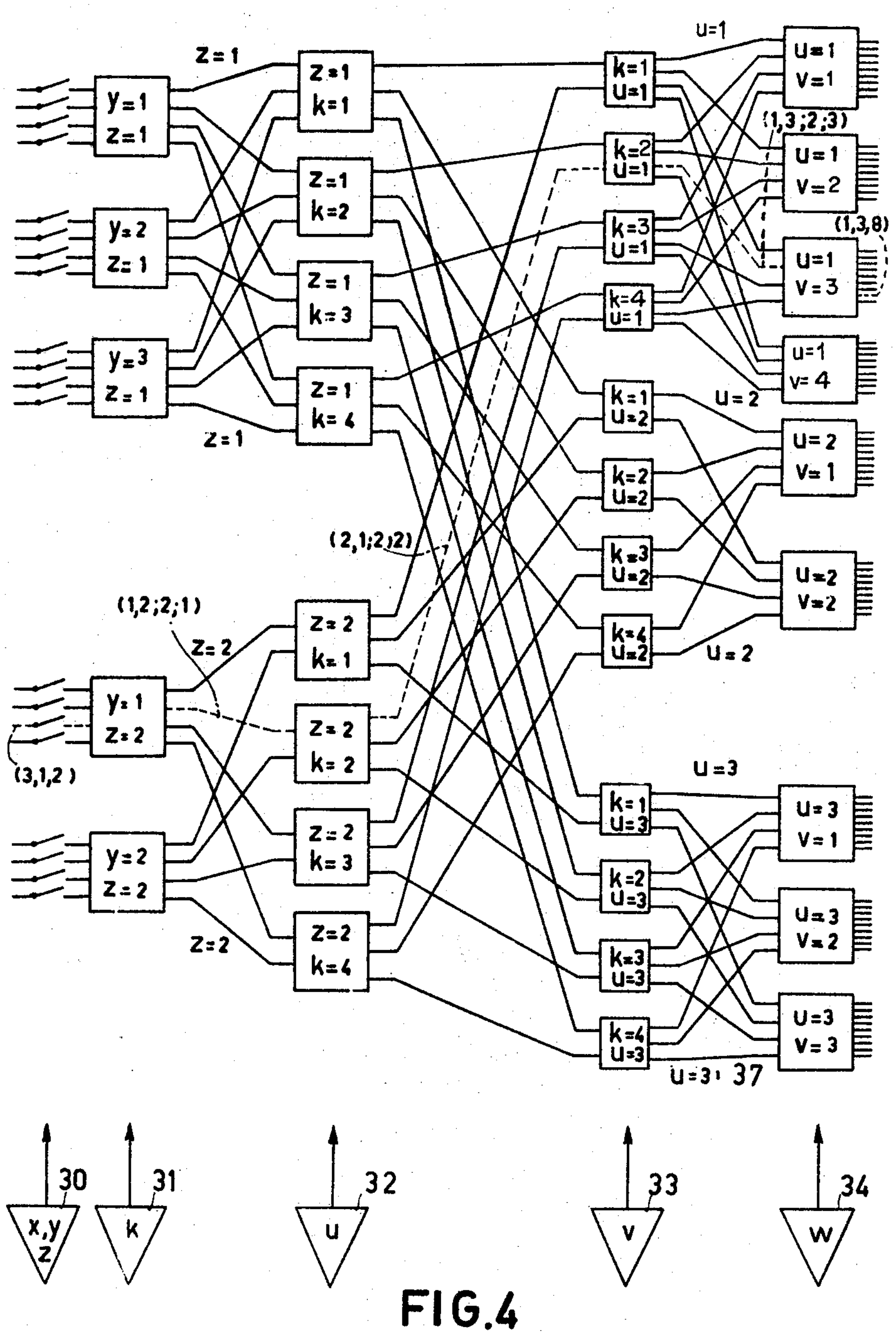
FIG. 4 shows the principle of the relative connection between the switching matrices in a switching network according to the invention and the setting members of said switching network.

FIG. 4 illustrates the principle of the method of connecting the switching matrices in a large switching network. This switching network comprises four switching stages i.e. the A-stage, the B-stage, the C-stage and the D-stage. The switching matrices forming together the A-stage are termed A-switches. For the switching matrices of the B-, C- and D-stages analogous references are employed.

The A- and B-switches are arranged in two AB-groups. The first AB-group comprises three A-switches and four B-switches, the second AB-group two A-switches and four B-switches. The C- and D-switches are arranged in three CD-groups. The first CD-group includes four C-switches and four D-switches. The second CD-group includes four C-switches and two D-switches. The third CD-group includes four C-switches and three D-switches. Each AB-group is indicated by a coordinate $z$: for the first AB-group $z=1$, for the second AB-group $z=2$. Each CD-group is indicated by a co-ordinate $u$: for the first CD-group $u=1$, for the second CD-group $u=2$ and for the third CD-group $u=3$. Each A-switch is indicated by a set of two co-ordinates $y$ and $z$. The A-switch $A_{yz}$ is thus the $y$th A-switch of the $z$th AB-group. Each D-switch is indicated by a set of two co-ordinates $u$ and $v$; $D_{uv}$ is the $v$th D-switch of the $u$th CD-group. The B-switches are indicated by a set of two co-ordinates $z$ and $k$ and $B_{zk}$ is the $k$th B-switch of the $z$th AB-group. The C-switches are indicated by a set of two co-ordinates $u$ and $k$ and $C_{uk}$ is the $k$th C-switch of the $u$th CD-group. The reason of using a common co-ordinate $k$ for the B- and C-switches and the significance of said co-ordinate will be explained hereinafter. Each input of the switching network is indicated by a set of three co-ordinates $x$, $y$ and $z$ and the input $(x, y, z)$ is the $x$th input of the $y$th A-switch of the $z$th AB-group, i.e. the $x$th input of the switch $A_{yz}$. Each output of the switching network is indicated by a set of three co-ordinates $u$, $v$ and $w$ and the output $(u, v, w)$ is the $w$th output of the $v$th D-switch of the $u$th CD-group, i.e. the $w$th output of the switch $D_{uv}$. The connecting wires between each A-switch and each B-switch are termed AB-links. The connecting wires between each B-switch and each C-switch are termed BC-links and the connecting wires between each C-switch and each D-switch are termed CD-links.

The so-called link pattern of the switching network shown in FIG. 4 is as follows. The $k$th output of the $y$th A-switch of the $z$th AB-group is connected to the $y$th input of the $k$th B-switch of the $z$th AB-group. Each AB-link thus extends inside the same AB-group and is indicated by a set $(y, z; k; s)$ of four co-ordinates $y$, $z$, $k$ and $s$. The first co-ordinate $y$ indicates the A-switch inside the relevant AB-group, from which extends the AB-link. The second co-ordinate $z$ indicates the AB-group inside which the AB-link extends. The third AB-link and the third co-ordinate $k$ indicates the number of the output of the relevant A-switch, from which the AB-link extends. This number is also equal, in accordance with the link pattern, to the number of the C-switch in the relevant CD-group towards which extends the link. The fourth co-ordinate $s$ is equal to 1 for all AB-links.

The $u$th output of the $k$th B-switch of the $z$th AB-group is connected to the $z$th input of the $k$th C-switch of the $u$th CD-group. Thus each AB-group is connected to each CD-group and even each C-switch is connected to a D-switch of each CD-group. A BC-link is indicated by a set $(z, u; k; s)$ of four co-ordinates $z$, $u$, $k$ and $s$. The first co-ordinate $z$ indicates the AB-group from which extends. The BC-link; the second co-ordinate $u$ indicates towards which CD-group the BC-link extends. The third co-ordinate $k$ indicates the number of the B-switch inside the relevant AB-group, from which the BC-link extends. This number is equal, in accordance with the link pattern, to the number of the C-switch inside the relevant CD-group, towards which the BC-link extends. The fourth co-ordinate $s$ is equal to 2 for all BC-links.

The $v$th output of the $k$th C-switch of the $u$th CD-group is connected to the $k$th input of the $v$th D-switch of the $u$th CD-group. Each CD-link thus extends completely inside one and the same CD-group and is indicated by a set $(u, v; k; s)$ of four co-ordinates $u$, $v$, $k$ and $s$. The first co-ordinate $u$ indicates the CD-group inside which the CD-link extends. The second co-ordinate $v$ indicates the number of the D-switch inside the relevant CD-group towards which the CD-link extends. The third co-ordinate $k$ indicates the number of the C-switch of the relevant CD-group, from which the CD-link starts. This number is equal, in accordance with the link pattern, to the number of the input of the relevant D-switch, towards which the CD-link extends. The fourth co-ordinate $s$ is equal to 3 for all CD-links. This switching pattern requires that the AB-groups should all comprise the same number of B-switches and the CD-groups shall comprise the same number of C-switches; this number (in the switching network of FIG. 4 the number 4) is equal to the number of values which the co-ordinate $k$ may assume. Each B-switch has furthermore the same number of outputs as the number of CD-groups and each C-switch has the same number of inputs as the number of AB-groups. Similar relations exist between the numbers of outputs of the A-switches and the inputs of the B-switches of the same AB-group and between the outputs of the C-switches and the inputs of the D-switches of the same CD-group. In the switching network shown a certain degree of irregularity is provided on purpose in order to put into evidence the generality of the link pattern. The link pattern may even be further generalised by replacing each link by $q$ parallel links. A further generalisation, which may, if desired, be combined with the first-mentioned generalisation, consists in that pairs of switching matrices of the same switching stage are combined to form a greater switching matrix, which comes down to a certain degree of mixing, so that the advantages involved, i.e. reduction of the risk of stagnation and hence increase in efficiency of given links are obtained.

With reference to the link pattern shown in FIG. 4 it will be seen that a number of channels can be built up between any input $(x, y, z)$ and any output $(u, v, w)$ of the switching network, each channel extending through a different B-switch and hence through a different C-switch. These channels can be distinguished from each other by the co-ordinate $k$; for this reason the co-ordinate $k$ is termed the channel number. A set of links forming in common a channel from the input $(x, y, z)$ toward the output $(u, v, w)$ has the sets of co-ordinates $(y, z; k; 1)$, $(z, u; k; 2)$ and $(u, v; k; 3)$; the co-ordinates $y$, $z$, $u$ and $v$ are determined by the relevant input and output and the co-ordinate $k$ may have any of the values 1, 2, 3 or 4, but has the same value for three links forming together a channel. Between each input and each output four channels may be formed, from which a selection has to be made.

Figure 5:
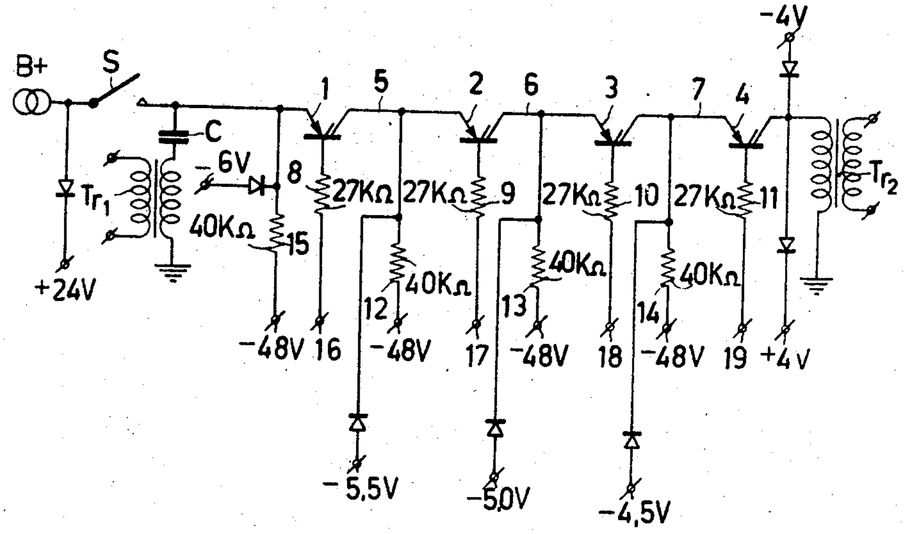
FIG. 5 shows in detail a diagram of a channel in a switching network according to the invention and the manner of marking.

FIG. 5 shows in detail the members forming together a channel. The input of the channel is connected via a switch S to the output terminal of a voltage source $B_+$ having a high internal resistance. The output terminal of said voltage source is connected through a diode to a voltage source having a low internal resistance and supplying a voltage of +24 v. Thus the voltage at the output terminal of the voltage source $B_+$ can never exceed +24 v. The input of the channel is furthermore connected, after the switch S, to a winding of atransformer $Tr_1$. This transformer can inject a signal into the channel or it can derive a signal from said channel. After the switch S the input of the channel is furthermore connected through a resistor 15 to a voltage source of −48 v. and through a diode to a voltage source of −6 v. When the switch S is open, the input of the channel after said switch has a voltage of −6 v. By closing the switch S this voltage rises to +24 v.

The output of the channel is connected through a winding of a second transformer $Tr_2$ to ground and through two diodes to voltage sources of −4 v. and+4 v. The transformer $Tr_2$ can inject a signal into the channel or it can derive a signal from the channel.

The channel extends through the four transistors 1, 2, 3 and 4, which constitute crossings in an A-switch, a B-switch, a C-switch and a D-switch respectively and through three links 5, 6 and 7, which are an AB-link and a CD-link respectively. The base of the transistor 1 is connected through a resistor 8 to a marking terminal 16. In a similar manner the bases of the transistors 2, 3 and 4 are connected through a resistor 9, 10 or 11 respectively to a marking terminal 17, 18 or 19 respectively. The AB-link 5 is connected through a resistor 12 to the voltage source of −48 v. and through a diode to a voltage source of −5.5 v. The BC-link 6 is connected through a resistor 13 to a voltage source of −48 v. and through a diode to a voltage source of −5.0 v. The CD-link 7 is connected through a resistor 14 to a voltage source of −48 v. and through a diode to a voltage source of −4.5 v.

A channel is built up as follows: initially the switch S is open and the marking terminals 16, 17, 18 and 19 have a voltage of +30 v. The emitter of the transistor 1 has a voltage of −6 v., that of the transistor 2 a voltage of −5.5 v., that of the transistor 3 a voltage of −5.0 v. and that of the transistor 4 a voltage of −4.5 v. Between the emitter and the base of each transistor 1, 2, 3 and 4 there prevails a voltage which blocks the relevant transistor. For building up the channel the switch S is closed and the voltage of the marking terminals 16, 17, 18 and 19 is reduced from +30 v. to +16 v. Thus the voltage of the emitter of the transistor 1 rises to +24 v. and the voltage of the base of this transistor drops to +16 v. The transistor 1 thus becomes conducting. This results in that the voltage of +24 v. propagates up to the emitter of the transistor 2, which thus also becomes conducting. This again results in that the voltage of +24 v. propagates up to the emitter of the transistor 3, which also becomes conducting, so that the voltage of +24 v. propagates up to the emitter of the transistor 4, which also becomes conducting. Since the collector of the last-mentioned transistor is connected to earth via the low resistance of the winding of the transformer $Tr_2$ the voltage of the whole channel, betwen its input and its output, will drop to about zero volt. The voltage supplied by the source $B_+$ is substantially completely lost across the high internal resistance of the voltage source. For the reasons already discussed with reference to FIGS. 1 and 2 the four transistors 1, 2, 3 and 4 remain conducting, even if the voltages of the marking terminals 16, 17, 18 and 19 are subsequently again raised to +30 v. The channel is broken up by opening the switch S. This involves that none of the transistors can any longer convey current, so that the bases of these transistors assume the +30 v. voltage and the BC-link, the BC-link and the CD-link assume a voltage of −5.5 v., −5.0 v. and −4.5 v. respectively. Between the emitter and the collector of each of the four transistors there then prevails a voltage of about 0.5 v., which blocks these transistors. If this measure were not taken, these transistors could remain conducting due to the leakage currents through transistors multiplied thereto in the switching matrices in spite of the opening of the switch S, which would mean that a channel once built up could no longer be broken up.

It will be easily seen that the reduction of +30 v. to +16 v. of the marking voltage of the base of a transistor in a built-up channel i.e. of the base of a transistor already rendered conducting before does not affect the conductive or non-conductive state of the relevant transistor, but produces a slight interference pulse in the channel extending through said transistor. This reduction of the voltage of the marking terminal does neither affect the conductive or non-conductive state of a transistor connected thereto, if the emitter thereof does not have a voltage of +24 v., i.e. if it has a voltage of −6.0 v., −5.5 v., −5.0 v., or −4.5 v. Only a transistor connected through a built-up channel portion to a closed switch S, the emitter of which consequently has a voltage of +24 v. can be changed over from the non-conducting state to the conducting state by a reduction of the voltage at its base from +30 v. to +16 v. Consequently, double marking cannot occur. Each transistor of the switching network is marked by the coincidence of the marking of an input of the switching network by the closure of a switch S through a channel portion already built up to said transistor and the marking of a marking terminal connected to the base of said transistor. This permits of simplifying considerably the marking system of the switching network.

In FIG. 4 the marking members are designated by reference numerals 30, 31, 32, 33 and 34; in this figure they are shown diagrammatically in the form of contact pyramids. The function of these marking members will be readily understood with reference to an example. It will be assumed that a channel having the channel number 2 has to be built up between the input (3, 1, 2) and the output (1, 3, 8). In FIG. 4 this channel is indicated by a broken line; it extends over the links (1, 2; 2; 1), (2, 1; 2; 1) and (1, 3; 2; 3).

The marking member 30 has the same number of outputs as there are switches S, i.e. as there are inputs in the switching network. From a control-member or from the operator the marking member receives a signal which is identified by the set of co-ordinates $(x, y, z)$ of the input concerned. Each output of the marking member 30 is connected to the control-terminal of a switch S. If the marking member 30 receives a signal identified by a given set of co-ordinates $(x, y, z)$, the output connected to the switch S indicated by this set of co-ordinates has produced across it a signal for example a pulse, which definitely closes this switch. In the chosen example the marking member 30 receives a signal identified by the set of co-ordinates (3, 1, 2) and the switch S connected to the input (3, 1, 2) is definitely closed.

The marking member 31 has the same number of outputs as there are different values of the channel number $k$ and it receives a signal which is identified by a given value of this channel. With the reception of this signal the voltage of the output corresponding to the given value of $k$ is transiently reduced from +30 v. to +16 v. This output is connected to the bases of all transistors of all A-switches, the collectors of which are connected to an AB-link, the co-ordinate $k$ of which has the value indicated by the signal. Consequently, for each A-switch this is the same number of transistors as the number of inputs of said switch. However, of all these transistors only one becomes conducting, i.e. the transistor connected to a previously closed switch S. In the example chosen $k=2$ and only the transistor of the A-switch $A_{12}$, which connects the input (3, 1, 2) to the AB-links (1, 2; 2; 1), becomes conducting.

The marking member 32 has the same number of outputs as the number of different values of the co-ordinate $u$ and it receives a signal identified by a given value of said co-ordinate. With the reception of this signal the voltage of the output corresponding to the relevant value of $u$ is transiently reduced from +30 v. to +16 v. This output is connected to the bases of all transistors of all B-switches, the collectors of which are connected to a BC-link, the co-ordinate $u$ of which has the value indicated by the signal. For each B-switch this is the same number of transistors as the number of inputs of said switch. Of all these transistors however, only one becomes conducting, i.e. the transistor, the emitter of which is connected to the AB-link which has previously been connected via a transistor an A-switch to a closed switch S. In the example chosen $u=1$ and only the transistor of the B-switch $B_{22}$ becomes conducting, which connects the links (1, 2; 2; 1) and (2, 2, 2) to each other.

The marking member 33 has the same number of outputs as the possible different values of the co-ordinate $v$ and it receives a signal which is identified by a given value of this co-ordinate. With the reception of this signal the voltage of the output corresponding to the given value of v is transiently reduced from +30 v. to +16 v. This output is connected to the bases of all transistors of all C-switches, the collectors of which are connected to a CD-link, the co-ordinate $v$ of which has the value indicated by the signal. For each C-switch this means the same number of transistors as the number of inputs of this switch. Of all these transistors, however, only one becomes conducting, i.e. the transistor, the emitter of which is connected to the BC-link which starts from previously conducting transistor in a B-switch. In the example chosen $v=3$ and only the transistor of the C-switch $C_{12}$ becomes conducting, which interconnects the links (2, 1; 2; 2) and (1, 3; 2; 3).

The marking member 34 has the same number of outputs as the number of different values of the co-ordinate $w$ and it receives a signal which is identified by a given value of w is transiently reduced from +30 v. to +16 v. the voltage of the output corresponding to the relevant value of $w$ is transiently reduced from +30 v. to +16 v. This output is connected to all bases of all transistors of all D-switches, the collectors of which are connected to an output, the co-ordinate $w$ of which has the value indicated by the signal. For each D-switch this means the same number of transistors as the number of inputs of this switch. Of all these transistors, however, only one becomes conducting, i.e. the transistor, the emitter of which is connected to a CD-link, which starts from a previously conducting transistor in a C-switch. In the example chosen $w=8$ and only the transistor of the D-switch $D_{13}$ becomes conducting, which connects the CD-link (1, 3; 2; 3) to the output (1, 3, 8).

The control-signals can be applied simultaneously to all marking members 30, 31, 32, 33 and 34, but they may also be fed in order of succession to these marking members in the given order.

From the foregoing it will be seen that with the composition of a channel in the switching network many more transistors receive a marking pulse at their bases than the number of transistors to be rendered conducting. This is unobjectionable for transistors which were non-conducting and remain non-conducting, since no built-up channel passes through these transistors. For the transistors already conducting and remaining conducting, through which there is already a built-up channel, said pulses introduce an interference in the channel and the object of the invention is to suppress these interferences as far as possible. This is found to be possible by minimizing the duration of the marking pulses, which can be achieved as follows. First a signal identified by a given set of co-ordinates $(x, y, z)$ is fed to the marking member 30 (FIG. 4), so that the relevant switch S is definitely closed. Then, such a time later that the marking process of the switch S has certainly terminated, a signal identified by a given value of the channel number $k$ is fed to the marking member 31. Thus a transistor initially non-conducting in the A-switch becomes conducting, so that at one of the AB-links a voltage of +24 v. appears. This voltage is used in a manner to be described hereinafter for breaking up the marking pulse produced by the marking member 31. The duration of this marking pulse is minimized but for the delay necessary for breaking up, the reduction being such as is admitted by a completely reliable operation of the channel marking in the switching network. Then, again such a time later that the marking process in an A-stage has certainly terminated, a signal identified by a given value of the co-ordinate $u$ is fed to the marking member 32, after which the marking process in the B-stage is performed in the same manner as in the A-stage. Subsequently, with adequate intervals, signals identified by given values of the co-ordinates $v$ and $w$ are fed to the marking members 33 and 34, so that the marking processes in the C-stage and in the D-stage are performed in the same manner as described above for the marking process in the A-stage.

Figure 6:
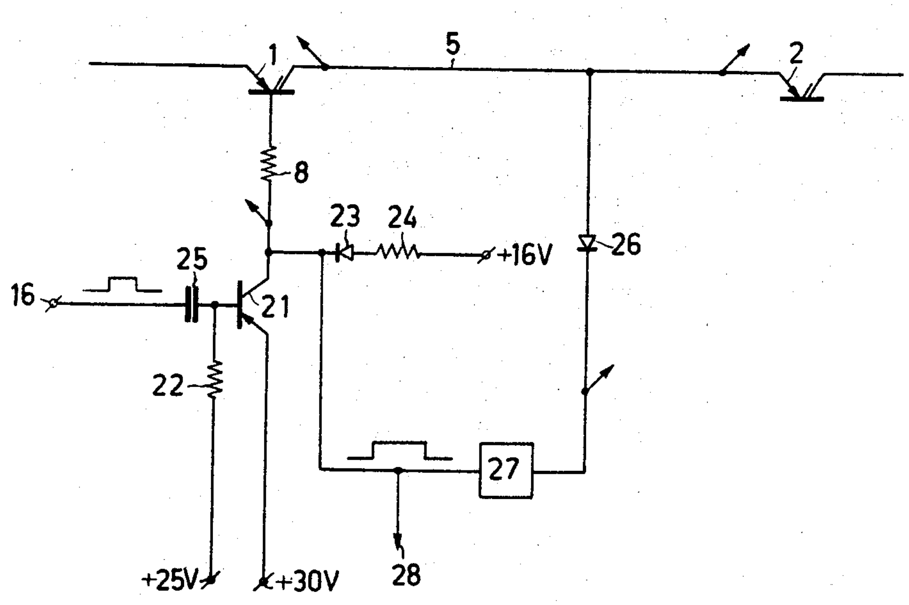
FIG. 6 shows the principle of a circuit for reducing the duration of a marking pulse to a minimum.

FIG. 6 illustrates the principle of an arrangement by means of which the idea described above can be technically realised. In this FIGURE 1 designates a pnpn-transistor of the A-stage, 5 the AB-link connected to the collector thereof and 2 a pnpn-transistor of the B-stage, connected to the AB-link. The base of the transistor 1 is connected via the collector-base-emitter path of a pnp-transistor 21 to a voltage source of +30 v. Of the transistor 21 the base is connected via a resistor 22 to a voltage source of +25 v. and the collector is connected via a diode 23 and a resistor 24 to a voltage source of +16 v. The base of the transistor 21 is, moreover, connected via a capacitor 25 to the marking terminal 16. The AB-link 5 is connected via a decoupling diode 26 to the input of a one-pulse generator 27, the output of which is connected to the collector of the transistor 21. The one-pulse generator 27 is constructed so that it responds to a rise of the voltage from −5.5 v. to +24 v. at its input by supplying a positive output pulse of a voltage of +30 v. and a duration which is at least equal to the duration of the marking pulses fed to a marking terminal. The one-pulse generator does not respond to a drop of the voltage at its input.

The arrangement operates as follows. In the rest position the base of the pnp-transistor 21 has a lower voltage than the emitter, so that this transistor is conducting. Thus the collector of the transistor has a voltage of +30 v. and the same applies to the base of the pnpn-transistor 1 as long as the latter is non-conducting, which will be provisionally be supposed. When a positive marking pulse is fed to the marking terminal 16, the transistor 21 becomes non-conducting for the duration of said pulse, so that the voltage at the base of the pnpn-transistor 1 drops from +30 v. to +16 v. The transistor 1 thus becomes conducting and the voltage of +24 v. at its emitter propagates to its collector and hence to the AB-link 5 and the input of the one-pulse generator 27. The latter thus supplies an output pulse which raises the voltage of the collector of the pnp-transistor 21 again to +30 v., so that its effect is equivalent to breaking up the marking pulse. The unavoidable delay involved in breaking up the marking voltage is mainly determined by the delay in the transmission of a pulse by the one-pulse generator 27, which delay may, however, be reduced to a great extent as compared with the periods of audio-frequencies. The delay of the diode 26 is so short that it has practically no effect. The diode 23 only serves for current economy. If this diode were not provided, current would constantly flow from the voltage source of +30 v. to the voltage source of +16 v. in the conducting state of the transistor 21; the diode 23 withholds this current, however.

Finally it should be noted that in the arrangement described a slight variation must be made for reducing interferences in the D-stage (transistor 4 of FIG. 5) since no voltage jump from a low negative voltage to +24 v. occurs. The arrangement shown in FIG. 6 may be modified so that the input of the one-pulse generator 27 is not connected to the collector but is connected to the emitter of the pnpn-transistor of the D-stage i.e. to the relevant CD-link. The one-pulse generators 27 must be of a construction such that it does not respond to a voltage drop, but responds to a rise in voltage. Otherwise the arrangement shown in FIG. 6 is not varied.

The arrangement shown in FIG. 6 has furthermore the advantage that it may be advantageously combined with a checking arrangement of the kind described in United States Patent No. 3,311,883. To this end the pulse supplied by the one-pulse generator 27 may be used, which is indicated in FIG. 6 by the tapping 28.

What is claimed is:

1. A switching network of the type comprising a plurality of input terminals, a plurality of output terminals, a plurality of switching stages each having a plurality of crossings, and means interconnecting said input terminals, output terminals and switching stages whereby a plurality of channels extend between each input terminal and each output terminal by way of a crossing of each switching stage, wherein each crossings comprises a bistable electronic switch having a marking terminal, a plurality of marking wires for each of said stages, means connecting each marking wire to a plurality of separate marking terminals in the respective stage, and means applying marking potentials to said marking wires; wherein the improvement comprises a separate marking potential suppressing means for each said marking wire, said potential suppressing means comprising means responsive to a change of state from non-conducting to conducting of any electronic switch connected to the marking wire connected thereto for producing a suppression potential, and means for applying said suppression potential to the respective marking line for suppressing said marking potential, whereby the duration of application of marking potentials to said marking terminals is minimized.

2. A switching network of the type having a plurality of input terminals, a plurality of output terminals, a plurality of switching stages connected between said input terminals and output terminals, each switching stage having a plurality of crossings whereby a plurality of channels extend between each input terminal and each output channel by way of a crossing of each stage, each crossing comprising a bistable electronic switch having a marking terminal, a plurality of marking lines for each switching stage, each marking line being connected to the marking terminals of a plurality of a plurality of separate bistable electronic switches, and means applying marking potentials to said marking wires; wherein the improvement comprises a separate marker suppression means for each marking line, said marker suppression means comprising means connected to each of the corresponding electronic switches for producing a pulse in response to a predetermined change in potential at an electrode of said electronic switches, and means for applying said pulse to the respective marker line with a polarity to cancel a marking potential on said marking line.

3. A switching network of the type having a plurality of channels extending between each of a plurality of input terminals and each of a plurality of output terminals, each of said channels including a plurality of bistable electronic switches having marking terminals, a plurality of marking lines each connected to a plurality of said marking terminals of electronic switches of different channels, and means for marking said channels comprising means for applying marking potentials to said marking lines and means for applying a potential to a selected input terminal, whereby the electronic switches in a selected channel are rendered conductive sequentially between said selected input terminal and a selected output terminal, said marking potentials being in the form of a pulse of predetermined maximum duration; wherein the improvement comprises one-pulse generator means for each said marker line, means connecting each said generator to each of the corresponding electronic switches for producing a suppression pulse in response to a predetermined change of conduction state of said corresponding electronic switches, said suppression pulses having a duration at least equal to the maximum duration of said marking potential pulses, and means applying said suppression pulses to the corresponding marking line with a polarity to cancel said marking pulses on said marking lines.

4. The switching network of claim 3 in which said electronic switches are pnpn transistors having their emitter-collector paths connected in series in the respective channels, and the base electrodes of said transistors are said marking terminals.

5. The switching network of claim 3 wherein each said means applying marking potentials to said marking lines comprises a source of a first potential, a transistor, means connecting the emitter of said transistor to said source of first potential, means connecting the collector of said transistor to the respective marking line, means biasing said transistor to be manually conductive, said first potential having a polarity and amplitude to hold non-conductive switches in a non-conductive state, a source of a second potential having an amplitude to initiate conduction of a marked switch, diode means for applying said second potential to said corresponding marking lines, said diode means being poled to be cut-off when said transistor is conductive, means applying said marking pulse to the base of said transistor with a polarity to cut off said transistor, whereby said second potential is applied to said marking line, and means applying said suppression pulse to said marking line with a polarity to cut off said diode.

References Cited

UNITED STATES PATENTS

| | | | |
|---|---|---|---|
| 2,840,801 | 6/1958 | Beter et al. | 340—166 |
| 2,913,704 | 11/1959 | Huang | 340—166 |
| 3,015,697 | 1/1962 | Klinkhammer | 340—166 X |
| 3,065,458 | 11/1962 | Lucas et al. | 340—166 |
| 3,079,588 | 2/1963 | Burston et al. | 340—166 |
| 3,129,293 | 4/1964 | Warman | 340—166 X |

NEIL C. READ, *Primary Examiner.*

H. I. PITTS, *Assistant Examiner.*

UNITED STATES PATENT OFFICE
CERTIFICATE OF CORRECTION

Patent No. 3,343,129 September 19, 1967

Mattheus Jacobus Schmitz

It is hereby certified that error appears in the above numbered patent requiring correction and that the said Letters Patent should read as corrected below.

Column 3, line 53, for "extends the AB-link" read -- the AB-link extends --; line 56, strike out "AB-link and the third"; line 68, after "which" insert -- the BC-link extends. The --; column 4, line 69, for "atransformer" read -- a transformer --; column 5, line 57, strike out "BC-link", first occurrence, and insert -- AB-link --; column 7, line 1, for "(2,2,2)" read -- (2,1;2,2) --; column 7, line 24, strike out "w is transiently reduced from +30v. to +16v." and insert instead -- this co-ordinate. With the reception of this signal --; column 8, line 66, for "generators" read -- generator --; column 9, line 35, strike out "of a plurality", second occurrence.

Signed and sealed this 15th day of April 1969.

(SEAL)
Attest:

EDWARD M.FLETCHER,JR.
Attesting Officer

EDWARD J. BRENNER
Commissioner of Patents